United States Patent
Lu et al.

(10) Patent No.: US 9,143,997 B2
(45) Date of Patent: Sep. 22, 2015

(54) SERVICE RESTORATION PROCESSING METHOD AND MOBILITY MANAGEMENT NETWORK ELEMENT

(71) Applicant: Huawei Technologies Co., Ltd., Shenzhen, Guangdong (CN)

(72) Inventors: Feng Lu, Shenzhen (CN); Zhongping Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 171 days.

(21) Appl. No.: 14/085,446

(22) Filed: Nov. 20, 2013

(65) Prior Publication Data

US 2014/0078890 A1  Mar. 20, 2014

Related U.S. Application Data

(63) Continuation of application No. PCT/CN2011/075249, filed on Jun. 3, 2011.

(51) Int. Cl.
*H04W 36/16* (2009.01)
*H04W 36/00* (2009.01)
*H04W 24/04* (2009.01)
*H04W 28/04* (2009.01)
*H04W 88/16* (2009.01)

(52) U.S. Cl.
CPC ............ *H04W 36/165* (2013.01); *H04W 24/04* (2013.01); *H04W 36/0022* (2013.01); *H04W 28/04* (2013.01); *H04W 88/16* (2013.01)

(58) Field of Classification Search
CPC .................... H04W 36/0033; H04W 36/0022; H04W 36/0027; H04W 36/12; H04W 36/10; H04W 40/36; H04W 48/18
See application file for complete search history.

(56) References Cited

U.S. PATENT DOCUMENTS

2007/0165573 A1* 7/2007 Hietalahti ...................... 370/331
2010/0227621 A1* 9/2010 Wu ............................... 455/450
(Continued)

FOREIGN PATENT DOCUMENTS

CN        101541097 A        9/2009

OTHER PUBLICATIONS

"3GPP TS 23.007—3$^{rd}$ Generation Partnership Project; Technical Specification Group Core Network and Terminals; Restoration procedures (Release 10)," Version 10.3.0, 3$^{rd}$ Generation Partnership Project, Valbonne, France (Mar. 2011).
(Continued)

*Primary Examiner* — Raj Jain
(74) *Attorney, Agent, or Firm* — Leydig, Voit & Mayer, Ltd.

(57) ABSTRACT

Determining, by a first mobility management network element and a second mobility management network element that are ISR associated, that a serving gateway fails, and saving, by the first mobility management network element and the second mobility management network element, a context of a user equipment that the serving gateway serves; receiving, by the first mobility management network element or the second mobility management network element, a trigger, and executing a service restoration process for the user equipment. According to the embodiments of the present invention, the mobility management network element executes a service restoration process, thereby ensuring normal operation of a service.

23 Claims, 7 Drawing Sheets

(56) References Cited

U.S. PATENT DOCUMENTS

2011/0170517 A1* 7/2011 Bakker et al. ............... 370/331
2013/0178204 A1* 7/2013 Zhang et al. ............... 455/423
2014/0078890 A1* 3/2014 Lu et al. .................... 370/221

OTHER PUBLICATIONS

"3GPP TR 23.857—$3^{rd}$ Generation Partnership Project; Technical Specification Group Core Network and Terminals; Study of EPC Nodes Restoration (Release 11)," Version 1.3.0, $3^{rd}$ Generation Partnership Project, Valbonne, France (May 2011).

"3GPP TSG CT4 Meeting #53—Pseudo-CR on New Solution for SGW Failure and restoration," Version 1.20, Document C4-111206, Agenda item 6.2, $3^{rd}$ Generation Partnership Project, Valbonne, France (May 2011).

"Pseudo-CR on Node Failure if ISR is activated," 3GPP TSG CT4 Meeting #51 bis, Ljubljana, Slovenia, C4-110158, $3^{rd}$ Generation Partnership Project, Valbonne, France (Jan. 24-28, 2011).

\* cited by examiner

SERVICE RESTORATION PROCESSING METHOD AND MOBILITY MANAGEMENT NETWORK ELEMENT

CROSS-REFERENCE TO RELATED APPLICATIONS

This application is a continuation of International Patent Application No. PCT/CN2011/075249, filed on Jun. 3, 2011, which is hereby incorporated by reference in its entirety.

TECHNICAL FIELD

The present invention relates to the field of mobile communications, and in particular to a service restoration processing method and a mobility management network element.

BACKGROUND

During the broadband and mobile development of networks, the 3rd Generation Partnership Program (3rd Generation Partnership Program, 3GPP for short) organizations separately set forth a long term evolution (Long Term Evolution, LTE for short) scheme, that is, an evolved universal mobile telecommunication system (UMTS) territorial radio access network (Evolved Universal Mobile Telecommunication System Territorial Radio Access Network, E-UTRAN), in a mobile access network, and set forth a system architecture evolution (System Architecture Evolution, SAE for short) scheme, that is, an evolved packet core (Evolved Packet Core, EPC for short), in a mobile core network. The E-UTRAN and the EPC form an evolved packet system (Evolved Packet System, EPS for short). In addition to accessing the EPC through the E-UTRAN, a user equipment (User Equipment, UE for short) can also access the EPC through a universal mobile telecommunication system territorial radio access network (Universal Mobile Telecommunication System Territorial Radio Access Network, UTRAN for short) or a global system for mobile communications (Global System for Mobile Communications, GSM for short)/enhanced data rate for GSM evolution (Enhanced Data rate for GSM Evolution, EDGE for short) radio access network (GSM EDGE Radio Access Network, GERAN for short).

Idle mode signaling reduction (Idle mode Signaling Reduction, ISR for short) refers to a mechanism for reducing signaling interaction that is provided when a UE in idle mode reselects a radio access network. The ISR may include two states, that is, an activation state and a deactivation state. A situation where a UE performs reselection between an E-UTRAN and a UTRAN/GERAN is taken as an example. In an ISR activation scenario, the UE needs to be registered with both a mobility management network element, that is, a mobility management entity (Mobility Management Entity, MME for short) in the E-UTRAN and a mobility management network element, that is, a serving general packet radio service (General Packet Radio Service, GPRS for short) supporting node (Serving GPRS Supporting Node, SGSN for short) in the UTRAN/GERAN. In the ISR activation scenario, a serving gateway (Serving GateWay, SGW for short) reserves both connection information of the MME and connection information of the SGSN, for example, a full qualified tunnel endpoint identifier (Full Qualified TEID, F-TEID for short) of the MME/SGSN or an IP address of the MME/SGSN. The MME and the SGSN save the connection information of each other, that is, the MME saves the connection information of the SGSN, and the SGSN saves the connection information of the MME. That the SGW saves both the connection information of the MME and the connection information of the SGSN means ISR activation for the SGW; and that the MME and the SGSN save the connection information of each other means ISR activation for the MME and the SGSN.

In the ISR activation scenario, when the SGW receives downlink user plane data or downlink control plane data of the UE, according to the saved connection information of the MME and connection information of the SGSN, the SGW triggers the corresponding MME and SGSN to page the UE. Therefore, regardless of whether the UE currently resides in the E-UTRAN or the UTRAN/GERAN, the UE can make a response to a paging message of a corresponding network in the network where the UE resides (that is, a called-related service of the UE is reachable).

However, in the ISR activation scenario, if an SGW fails, for example, an SGW failure with restart (SGW failure with Restart, also referred to as reset) or an SGW failure without Restart (SGW failure without Restart), a service of the user equipment that the SGW serves before the SGW fails is interrupted, and service experience of the user equipment is influenced.

SUMMARY

Embodiments of the present invention provides a service restoration processing method and a mobility management network element in an ISR activation scenario, so as to avoid a problem of interruption of a service of a user equipment due to a failure of a serving gateway in the ISR activation scenario.

According to one aspect, a service restoration processing method in an ISR scenario is provided, including: determining, by a first mobility management network element and a second mobility management network element that are idle mode signaling reduction ISR associated, that a serving gateway fails, and saving, by the first mobility management network element and the second mobility management network element, a context of a user equipment that the serving gateway serves; and receiving, by the first mobility management network element or the second mobility management network element, a trigger, and executing a service restoration process for the user equipment.

According to another aspect, a mobility management network element in an ISR activation scenario is provided, including: a determination unit, configured to determine that a serving gateway fails; a storage unit, configured to save a context of a user equipment that the serving gateway serves when the determination unit determines that the serving gateway fails; a receiving unit, configured to receive a trigger; and a restoration unit, configured to execute a service restoration process for the user equipment when the receiving unit receives the trigger.

According to the embodiments of the present invention, a first mobility management network element and a second mobility management network element that are ISR associated determine that a serving gateway fails and save a context of a user equipment associated with the serving gateway, and when the first mobility management network element or the second mobility management network element receives a trigger from the user equipment or another network element of a network side, the first mobility management network element or the second mobility management network element executes a service restoration process, thereby ensuring normal operation of a service.

BRIEF DESCRIPTION OF DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The technical solution of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
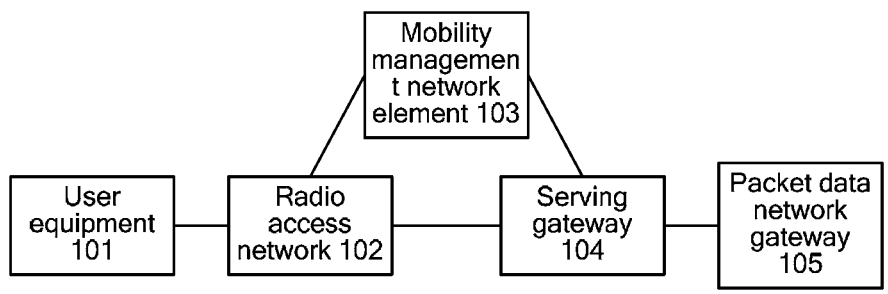
FIG. 1 is a schematic structural diagram of a communication system that is capable of using an embodiment of the present invention.

FIG. 1 is a schematic structural diagram of a communication system that is capable of using an embodiment of the present invention. As shown in FIG. 1, a user equipment 101 accesses through a local radio access network 102, a mobility management network element 103 is in charge of functions such as location management, connection management, security authentication, and gateway selection for a mobile user equipment, a serving gateway 104 is a local access gateway of the user equipment and is in charge of connection management and data forwarding that are related to an access technology, and a packet data network gateway 105 is a gateway for the user equipment to access an external data network.

In this embodiment of the present invention, the user equipment may be a user equipment (User Equipment, UE for short) or a mobile station (Mobile Station, MS for short).

In the embodiment of the present invention, the radio access network may be an evolved universal mobile telecommunication system territorial radio access network (Evolved Universal Mobile Telecommunication System Territorial Radio Access Network, E-UTRAN for short), where an access network element of the E-UTRAN may be an evolved network base station (E-UTRAN NodeB, eNodeB for short) or a global system for mobile communications (Global System for Mobile Communications, GSM for short)/enhanced data rate for GSM evolution (Enhanced Data rate for GSM Evolution, EDGE for short) radio access network (GSM/EDGE Radio Access Network, GERAN for short); an access network element of the GERAN may be a base station (Base Transceiver Station, BTS for short) or a universal mobile telecommunication system territorial radio access network (Universal Mobile Telecommunication System Territorial Radio Access Network, UTRAN for short); and an access network element of the UTRAN may be a 3G base station (NodeB).

In the embodiment of the present invention, the mobility management network element may be a mobility management entity (Mobility Management Entity, MME for short), or a serving GPRS support node (Serving GPRS Support Node, SGSN for short).

In the embodiment of the present invention, the serving gateway may be a serving gateway (Serving Gateway, SGW for short).

In the embodiment of the present invention, the packet data network gateway may be a packet data network gateway (Packet Data Network Gateway, PGW or PDN-GW for short).

Figure 2:
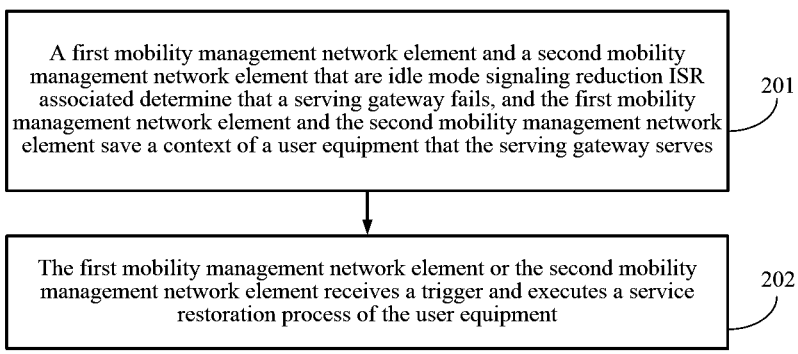
FIG. 2 is a flow chart of a method for processing a failure of a network device according to an embodiment of the present invention.

FIG. 2 is a flow chart of a method for processing a failure of a network device according to an embodiment of the present invention.

201: A first mobility management network element and a second mobility management network element that are idle mode signaling reduction ISR associated determine that a serving gateway fails, and the first mobility management network element and the second mobility management network element save a context of a user equipment that the serving gateway serves.

In this embodiment, a failure of the serving gateway may include, but is not limited to, an SGW failure with restart (SGW Failure with restart), or may be an SGW failure without restart (SGW Failure without restart). The first or second mobility management network element may determine that the serving gateway fails, and a specific manner may include, but is not limited to, the following:

(1) A mobility management network element receives a path detection (for example, an echo request) message sent by the SGW, and the mobility management network element determines, by comparing the difference between a numerical value, which is included in the path detection message, of a local restart counter and a locally stored numerical value of a local restart counter of the serving gateway (for example, the former is 1 greater than the latter), the SGW failure with restart; or, (2) A mobility management network element sends a path detection (for example, an echo request) message to the serving gateway, and does not receive a response message for a long time, the mobility management network element determines that the SGW failure without restart occurs on the serving gateway.

(3) A mobility management network element receives a notification message sent by an operation and maintenance system, and acquires that the SGW failure without restart or the SGW failure with restart occurs on the serving gateway.

The saving a context of a user equipment that the serving gateway serves may specifically include, but is not limited to, querying, by a mobility management network element, a locally stored context of the user equipment, and if a serving gateway recorded in the context of the user equipment is the serving gateway that fails, saving, by the mobility management network element, the content of the user equipment.

The saving a context of a user equipment may specifically include: saving a packet data network connection context (PDN connection context or PDN context table data, PDN connection context for short) and/or mobility management bearer context (MM Bearer Context) of the user equipment. The saved context of the user equipment includes the following information: identification information of the user equipment, for example, an international mobile subscriber identity (International Mobile Subscriber Identity); and/or an access point name (access point name, APN for short); and/or a bearer identity (Bearer ID), where one PDN connection may include one or more bearers and each bearer has one unique bearer identity with a user granularity, quality of service (Quality of Service, QoS for short) information of a bearer, where the QoS information may specifically include a quality of service class identifier (QoS class identifier, QCI for short), and/or allocation/retention priority (allocation/retention priority, ARP for short).

After determining that the SGW fails, the mobility management network element may save all contexts of all user equipments that the serving gateway serves, and may save a relevant context of a relevant user equipment according to a context saving policy.

The context saving policy may include a user equipment granularity policy and/or a context granularity policy. In view of the user equipment granularity, the user granularity policy may be, with reference to a type of a user, for example, saving a context of a gold user (having a high priority), and may also be directly set as that contexts of a part of user equipments need to be saved (for example, some particular IMSIs), and contexts of a part of user equipments do not need to be saved. In view of the context granularity, reference may be made to the QoS information of the bearer, for example, saving a context of a specific QCI value or a specific ARP value, and may also be saving all contexts of the user equipment, or saving a part of contexts of the user equipment. The context saving policy may include both the user granularity policy and the context granularity policy, or may only include any one of the user granularity policy and the context granularity policy.

The mobility management network element may be configured with the context saving policy locally. Locally configuring the context saving policy may be considered as a common means for performing configuration according to an operator policy. In addition, the context saving policy information may also be acquired from another network element, for example, a PGW or an HSS (home subscriber server, home subscriber server)/HLR (home location register, home location register). A specific implementation manner of the instruction is not limited in the present invention.

In addition, this embodiment may further include determining, by a data packet gateway, that the serving gateway fails, and reserving the context of the user equipment that the serving gateway serves. Specifically, the PGW may save all contexts of all user equipments that the serving gateway serves, and may also save a relevant context of a relevant user equipment according to the context saving policy. For the packet data network gateway, in addition to the above local configuration, alternatively, the context saving policy information may also be acquired from another network element, for example, an MME, an SGSN, or a PCRF (policy and charging rules function, policy and charging rules function).

Generally, policies configured on the mobility management network element and the packet data network gateway are consistent. If the policies are not consistent, for example, in a roaming scenario, the mobility management network element and the packet data network gateway belong to different operators, the mobility management network element and the packet data network gateway further need to synchronize the context saving results. Specifically, in this case, after one network element of the mobility management network element and the packet data network gateway detects that an SGW fails, the network element first saves a context of a user equipment that the serving gateway serves, and the other network element executes a process of saving a context of the user equipment and then notifies the former network element of a context saving result (that is, which context is saved), so as to synchronize the context save results. In the present invention, it is recommended that the packet data network gateway execute the process of saving the context of the user equipment and then notify the mobility management network element of saving a context of a user equipment that is consistent with the context saved by the packet data network gateway; or, before one network element of the mobility management network element and the packet data network gateway detects that an SGW fails, for example, when the user equipment creates a packet data network connection process, the mobility management network element notifies the packet data network gateway of the acquired context saving policy, or the packet data network gateway notifies the mobility management network element of the acquired context saving policy, so as to ensure that the mobility management network element and the packet data network gateway save the synchronous context after acquiring that the SGW fails.

In addition to saving, by the mobility management network element or the packet data network gateway, the context of the user equipment, starting a timer is further included. The timer may be used to guarantee step 202, that is, when a trigger related to the saved context of the user equipment is received, and when the timer does not expire, a service restoration process is executed. In addition, the timer also controls time for saving the context of the user equipment. If the timer expires, the mobility management network element deletes the saved context of the user equipment.

A length of the timer may be equal to a periodic tracking area update timer (periodic tracking area update timer, PTAU timer for short) or a periodic routing area update timer (periodic routing area update timer, PRAU timer for short).

202: The first mobility management network element or the second mobility management network element receives a trigger and executes a service restoration process for the user equipment.

The receiving, by the first mobility management network element or the second mobility management network element, a trigger specifically includes: receiving, by the first mobility management network element or the second mobility management network element, a notification message sent by the packet data network gateway or the serving gateway; or, receiving, by the first mobility management network element, a notification message sent by the second mobility management network element; or, receiving, by the second mobility management network element, a notification message sent by the first mobility management network element; or, receiving, by the first mobility management network element or the second mobility management network element, a tracking area update request, routing area update request, or service request message sent by the user equipment.

Herein, a specific name of the notification message or the request message has no limitation on this embodiment of the present invention, and this embodiment of the present invention includes triggering the mobility management network element to execute the service restoration process by adopting a message/signaling of other types or names.

The executing a service restoration process for the user equipment specifically includes: executing a network connection re-establishment process; or, triggering the user equipment to initiate an attach process.

(1) The executing a network connection re-establishment process specifically includes:

(1.1) In the case that the first mobility management network element or the second mobility management network element receives a notification message sent by the packet data network gateway or the serving gateway, or that the first mobility management network element receives a notification message sent by the second mobility management network element, or that the second mobility management network element receives a notification message sent by the first mobility management network element, the first mobility management network element and the second mobility management network element send a paging message to the user equipment, the first mobility management network element or the second mobility management network element receives a service request process sent by the user equipment, and the first mobility management network element or the second mobility management network element executes a serving gateway relocation process. Or, (1.2) In the case that the first mobility management network element or the second mobility management network element receives the service request message sent by the user equipment, the first mobility management network element or the second mobility management network element executes a serving gateway relocation process. Or, (1.3) In the case that the first mobility management network element or the second mobility management network element receives the tracking area update request or routing area update request message sent by the user equipment, the first mobility management network element or the second mobility management network element executes a serving gateway relocation process.

The serving gateway relocation process specifically includes: selecting, by the first mobility management network element or the second mobility management network element, one serving gateway; and sending, by the first mobility management network element or the second mobility management network element, a session creation request message to the selected serving gateway, so that the selected serving gateway sends a bearer modification request message to the packet data network gateway.

After the first mobility management network element or the second mobility management network element receives the notification message sent by the packet data network gateway or the serving gateway, or the first mobility management network element receives the notification message sent by the second mobility management network element, or the second mobility management network element receives the notification message sent by the first mobility management network element, or the first mobility management network element or the second mobility management network element receives the service request message sent by the user equipment, the following is further included: executing, by the first mobility management network element or the second mobility management network element, a globally unique temporary identifier (GUTI) reallocation or packet temporary mobile subscriber identity P-TMSI reallocation process, so that the user equipment executes a tracking area update or routing area update process to deactivate ISR.

After the first mobility management network element or the second mobility management network element receives the tracking area update request or routing area update request message sent by the user equipment, the following may be further included: instructing the user equipment to deactivate ISR, and/or instructing the serving gateway (that is, the selected serving gateway) to deactivate ISR. The instructing to deactivate ISR may be not instructing to activate ISR.

In addition, the following may be further included: instructing, by the first mobility management network element, the second mobility management network element to deactivate ISR, or instructing, by the second mobility management network element, the first mobility management network element to deactivate ISR.

(2) The triggering the user equipment to initiate an attach process specifically includes:

(2.1) In the case that the first mobility management network element or the second mobility management network element receives a notification message sent by the packet data network gateway or the serving gateway, or that the first mobility management network element receives a notification message sent by the second mobility management network element, or that the second mobility management network element receives a notification message sent by the first mobility management network element, the first mobility management network element and the second mobility management network element sends a paging message carrying an international mobile subscriber identity IMSI of the user equipment to the user equipment, so that the user equipment initiates the attach process. Or, (2.2) In the case that the first mobility management network element or the second mobility management network element receives the service request, tracking area update request, or routing area update request message sent by the user equipment, the first mobility management network element or the second mobility management network element sends a service reject, tracking area update reject, or routing area update reject message to the user equipment, so that the user equipment initiates the attach process.

The first mobility management network element or the second mobility management network element receives the notification message sent by the packet data network gateway or the serving gateway, or the first mobility management network element receives the notification message sent by the second mobility management network element, or the second mobility management network element receives the notification message sent by the first mobility management network element, where the notification message carries the international mobile subscriber identity IMSI of the user equipment. The notification message carrying the IMSI is used to instruct the mobility management network element to execute the service restoration process for the user equipment. In addition, the notification message may further include a bearer identity and/or an access point name APN and/or a quality of service class identifier QCI and/or allocation/retention priority ARP. The bearer identity and/or the access point name APN and/or the quality of service class identifier QCI and/or the allocation/retention priority ARP is used to instruct the mobility management network element to execute a service restoration process for the bearer/PDN connection of the user equipment.

In this embodiment, the first mobility management network element may be an MME or an SGSN, and correspondingly, the second mobility management network element is an ISR associated SGSN or MME.

In this embodiment of the present invention, when the user equipment needs to send uplink data or signaling or needs to receive downlink data or signaling, the user equipment triggers the bearer re-establishment process, so that the re-establishment process may be executed in a dispersed manner according to service usage of a user. In this case, feasibility is good and impact on the system is minor.

According to this embodiment of the present invention, a first mobility management network element and a second mobility management network element that are ISR associated determine that a serving gateway fails and save a context of a user equipment associated with the serving gateway, and when the first mobility management network element or the second mobility management network element receives a trigger from the user equipment or another network element of a network side, the first mobility management network element or the second mobility management network element executes a service restoration process, thereby ensuring normal operation of a service.

Figure 3:
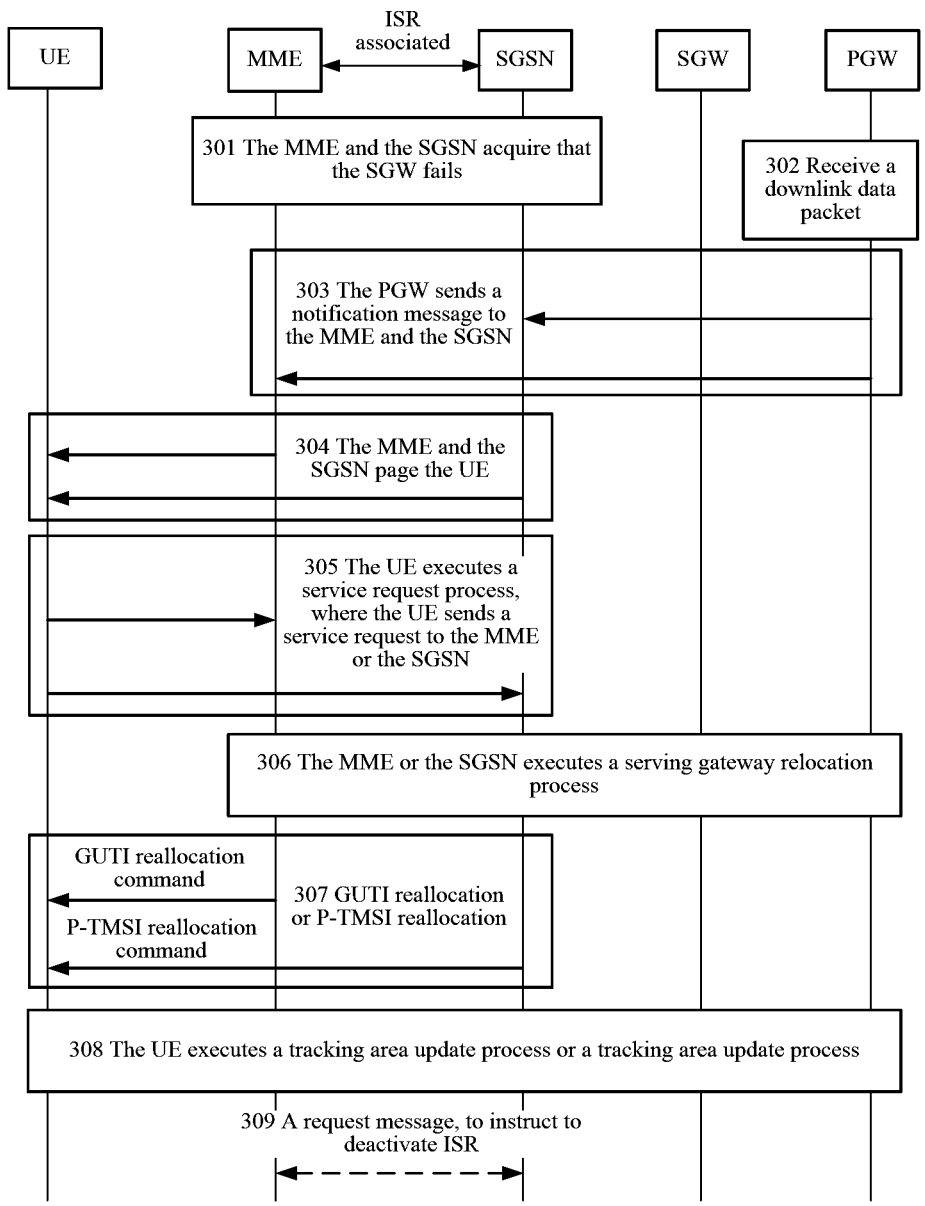
FIG. 3 is a schematic flow chart of a failure processing procedure according to an embodiment of the present invention.

The following describes the embodiments of the present invention in detail with reference to specific examples. FIG. 3 is a schematic flow chart of a failure processing procedure according to an embodiment of the present invention. In an example in FIG. 3, a first mobility management network element or a second mobility management network element obtains a trigger of a gateway device or another ISR associated mobility management network element and executes a service restoration process. For ease of description, UE is used to represent a user equipment, MME and SGSN are used to represent two ISR associated mobility management network elements, SGW is used to represent a serving gateway, and PGW is used to represent a packet data network gateway. However, the embodiments of the present invention are not limited to a specific system represented by these terms.

FIG. 3 is a schematic flow chart of a failure processing procedure according to an embodiment of the present invention.

301: A PGW and an MME/SGSN acquire that an SGW fails.

In this case, mobility management network elements may include a first mobility management network element and a second mobility management network element, where the first mobility management network element and the second mobility management network element are an MME and SGSN that are ISR associated. In this embodiment, the first mobility management network element may be an MME, or may be an SGSN, and the second mobility management network element is a corresponding SGSN or MME, which is not specifically limited in this embodiment.

A packet data network gateway and a mobility management network element determine that a serving gateway fails and save a context of a user equipment that the serving gateway serves. For a manner of saving a context of a user equipment, reference may be made to the description of 201 in FIG. 2. When determining that a serving gateway fails, the mobility management network element and the packet data network gateway saves a context of a user equipment that the serving gateway serves, and this step may specifically include, but is not limited to, querying, by the mobility management network element or the packet data network gateway, a locally stored (temporarily stored) context of the user equipment, and if a serving gateway recorded in the context of the user equipment is the serving gateway that fails, saving, by the mobility management network element or the packet data network gateway, the content of the user equipment.

After determining that the SGW fails, the mobility management network element and the packet data network gateway may save all contexts of all user equipments that the serving gateway serves, and may also save a relevant context of a relevant user equipment according to a context saving policy. In addition to saving, by the mobility management network element or the packet data network gateway, the context of the user equipment, starting a timer is further included. For a manner for the mobility management network element and the packet data network gateway to acquire the context saving policy and for an implementation manner of the timer, refer to the description of 201 in FIG. 2.

302: The PGW receives a downlink data packet related to the saved context of the user equipment.

Specifically, the PGW receives the downlink data packet and determines, according to destination IP address information in the downlink data packet, whether a corresponding context is saved, and if yes (that is, a context is located), the PGW determines that a downlink data packet related to the saved context of the user equipment is received, and a subsequent step is triggered; if no, the PGW may select discarding of the downlink data packet. The downlink data packet may include a downlink signaling plane message or a downlink user plane packet, which is not limited in this embodiment.

303: The PGW sends a notification message to the MME and the SGSN.

Specifically, this step may include, but is not limited to, the following several implementation manners (one of step 303A, step 303B, step 303C, and step 303D may be selected and executed herein, which is not limited in this embodiment).

Step 303A:

303A-1: The PGW (directly) sends a notification message to an MME and an SGSN that are ISR associated.

In this case, the PGW needs to acquire, from the SGW or another network element, address information or identity information of the MME and the SGSN that are ISR associated, so as to send the notification message to the MME and the SGSN. Specifically, for example, before the PGW acquires that the SGW fails, the PGW may acquire the MME/SGSN address information or identity information by receiving a request message (for example, a session creation request message or a bearer modification request message) sent by the SGW through an attach process, a tracking area update process, a routing area update process, a PDN connection activation process, or a PDP context activation process. In this case, the PGW may acquire the address information or the identity information of both the MME and the SGSN, and the PGW may update its stored MME address information/identity information according to the MME address information/identity information reported by the SGW, and update its stored SGSN address information/identity information according to the SGSN address information/identity information reported by the SGW.

The PGW receives the downlink data packet, matches to a corresponding context according to IP address information in the data packet, locates to the context, and may acquire the obtained (before acquiring that the SGW fails) MME/SGSN address information/identity information (for example, F-TEID of the MME/SGSN) and user equipment information (for example, an IMSI) corresponding to the downlink data packet. In addition, through further parsing, for example, through matching five-element information of the data packet, the PGW may acquire bearer information (for example, a bearer identity and/or quality of service of a bearer) corresponding to the data packet.

In this case, the timer that is started in step 301 does not time out, the PGW sends a notification message to the MME and the SGSN, where the notification message carries user equipment information corresponding to the downlink data packet, and an IP layer address in the notification message may be an IP address of the mobility management network element (where the IP address may be an IP address included in the MME/SGSN address information acquired by the PGW, or an IP address parsed or queried by the PGW according to the acquired MME/SGSN identity information).

303A-2: The PGW (directly) receives a response message sent by the MME and the SGSN.

Step 303B:

303B-1: The PGW sends a notification message to the SGW.

If a failure of the SGW is an SGW failure with restart, in this case, the PGW may send the notification message to the MME and the SGSN through the restarted SGW. If a failure of the SGW is an SGW failure without restart, in this case, the PGW may send the notification message to the MME and the SGSN through a backup SGW. The backup SGW may provide a service for a user equipment in the MME and the SGSN. The backup SGW belongs to the same operator as the restarted SGW. The PGW may acquire address information/identity information of a backup SGW corresponding to the SGW through configuration (for example, the PGW locally configures address information of a connectable SGW master device and backup device) or by querying a DNS; or, the PGW may acquire address information/identity information of a backup SGW by receiving a message that is sent by the SGW to the PGW and carries the address information/identity information of the backup SGW. For example, before the PGW acquires that the SGW fails, the PGW may acquire address information/identity information of a backup SGW (for example, an IP address of the backup SGW or FQDN of the backup SGW) by receiving a request message sent by the SGW through an attach process, a tracking area update process, a routing area update process, a PDN connection activation process, or a PDP context activation process.

In addition, the notification message sent by the PGW to the SGW may include the address information/identity information of the MME and the SGSN that are ISR associated, so as to instruct the SGW to send a notification message to the corresponding MME and SGSN.

303B-2: The PGW receives a response message sent by the SGW.

303B-3: The SGW sends a notification message to the MME and the SGSN.

The SGW may acquire, through a backup system or local configuration, the address information/identity information of the MME and the SGSN that are ISR associated, or may acquire, through step 303B-1, the address information/identity information of the MME and the SGSN that are ISR associated (that is, acquire from the PGW), so as to send the notification message to the MME and the SGSN; or, the SGW may send the notification message to one or more mobility management network elements in an MME pool (MME pool) and an SGSN pool (MME/SGSN Pool) (for example, all MMEs in the MME pool and SGSNs in the SGSN pool), where the one or more mobility management network elements are connected to the SGW. Specifically, if a manner of sending the notification message to all MMEs/SGSNs in the MME/SGSN pool is adopted, when an MME/SGSN in the MME/SGSN pool receives the notification message, and if the MME/SGSN that receives the notification message has saved a user equipment context of the user equipment, the MME/SGSN triggers a service restoration process; and if the MME/SGSN that receives the notification message has not saved a user equipment context of the user equipment, the MME/SGSN rejects the notification message (for example, the MME/SGSN sends a response message carrying a reject cause value to the SGW) or ignores the notification message.

303B-4: The SGW receives the response message sent by the MME and the SGSN.

Step 303C:

303C-1: The PGW (directly) sends a notification message to the MME/SGSN.

For a manner of acquiring the MME/SGSN address information/identity information, refer to 303A-1. A difference from step 303A-1 lies in that the PGW may acquire (stores) address information/identity information of only one mobility management network element of the MME and the SGSN herein. In this case, the PGW may update its stored MME/SGSN address information/identity information according to the MME/SGSN address information/identity information reported by the SGW. In this step, the PGW sends its acquired MME/SGSN (that is, in this case, the PGW is capable of sending only one of the mobility management network elements) the notification message. For implementation of the notification message, refer to 303A-1.

303C-2: The PGW receives a response message sent by the MME/SGSN.

303C-3: The MME/SGSN sends a notification message to an ISR associated SGSN/MME.

In this case, this step includes: sending, by the first mobility management network element, a notification message to the second mobility management network element, or sending, by the second mobility management network element, a notification message to the first mobility management network element (that is, the MME sends a notification message to the ISR associated SGSN or the SGSN sends a notification message to the ISR associated MME).

303C-4: The MME/SGSN receives a response message sent by the SGSN/MME.

Step 303D:

303D-1: The PGW sends a notification message to the SGW.

For selection of the SGW and the acquiring of address information/identity information of a backup SGW, refer to step 303B-1.

In addition, the notification message sent by the PGW to the SGW may further include MME/SGSN address information/identity information, and a difference from step 303B-1 lies in that the PGW acquires address information/identity information of only one mobility management network element of the MME and the SGSN herein. In this step, the notification message sent by the PGW to the SGW includes the address information/identity information of the only one mobility management network element.

303D-2: The PGW receives a response message sent by the SGW.

303D-3: The SGW sends a notification message to the MME/SGSN.

The SGW may acquire the MME/SGSN address information/identity information through a backup system or local configuration, or acquire, through step 303D-1, address information/identity information of the MME and the SGSN that are ISR associated (that is, acquire from the PGW), so as to send the notification message to the MME/SGSN; or, the SGW may send the notification message to one or more MMEs/SGSNs in an MME/SGSN pool (MME/SGSN Pool) (for example, all MMEs/SGSNs in the MME/SGSN Pool), where the one or more MMEs/SGSNs are connected to the SGW. Specifically, if a manner of sending the notification message to all MMEs/SGSNs in the MME/SGSN pool is adopted, when an MME/SGSN in the MME/SGSN pool receives the notification message, and if the MME/SGSN that receives the notification message has saved a user equipment context of the user equipment, the MME/SGSN triggers a service restoration process; and if the MME/SGSN that receives the notification message has not saved a user equipment context of the user equipment, the MME/SGSN rejects the notification message (for example, the MME/SGSN sends a response message carrying a reject cause value to the SGW) or ignores the notification message. A difference from 303B-3 lies in that the SGW only sends the notification message to its acquired MME or SGSN (only to the MME or to the SGSN) and does not send the notification message to both the MME and the SGSN; or, only sends the notification message to an MME/SGSN corresponding to the MME Pool or the SGSN Pool and does not send the notification message to an MME/SGSN corresponding to the MME Pool and an MME/SGSN corresponding to the SGSN Pool at the same time.

303D-4: The SGW receives a response message sent by the MME/SGSN.

303D-5: The MME/SGSN sends a notification message to an ISR associated SGSN/MME.

In this case, this step includes: sending, by the first mobility management network element, a notification message to the second mobility management network element, or sending, by the second mobility management network element, a notification message to the first mobility management network element (that is, the MME sends a notification message to the ISR associated SGSN or the SGSN sends a notification message to the ISR associated MME).

303D-6: The MME/SGSN receives a response message sent by the ISR associated SGSN/MME.

In summary, according to the foregoing several implementation manners, the (first or second) mobility management network element may receive a notification message sent by a gateway device (that is, the SGW or the PGW) or another ISR associated mobility management network element in this step, and a service restoration process is triggered.

The notification message received by the MME/SGSN and sent by the PGW or the SGW or the notification message received by the MME/SGSN and sent by the SGSN/SGSN carries an international mobile subscriber identity IMSI of the user equipment. The IMSI carried in the notification message is used to instruct the mobility management network element to execute a service restoration process for the user equipment.

In addition, the notification message may further include a bearer identity and/or an access point name APN and/or a quality of service class identifier QCI and/or allocation/retention priority ARP. The bearer identity and/or the access point name APN and/or the quality of service class identifier QCI and/or the allocation/retention priority ARP is used to instruct the mobility management network element to execute a service restoration process for the bearer/PDN connection of the user equipment.

304: The MME and the SGSN page the UE.

Specifically, the MME pages the UE through an evolved network base station (E-UTRAN NodeB, eNodeB for short), and the paging message carries a system architecture evolution temporary mobile subscriber identity (packet temporary mobile subscriber identity, SAE-TMSI for short). The SGSN pages the UE through a base station (Base Transceiver Station, BTS for short) or a 3G base station (NodeB), and the paging message carries a packet temporary mobile subscriber identity (packet temporary mobile subscriber identity, P-TMSI for short).

The MME/SGSN queries, according to the IMSI carried in the notification message, a context of a user equipment saved by the MME/SGSN, and acquires a corresponding system architecture evolution temporary mobile subscriber identity or packet temporary mobile subscriber identity.

In this case, because a network side cannot know whether the UE resides on an E-UTRAN or on a UTRAN/GERAN, both the two mobility management network elements, the MME and the SGSN, need to page the UE, so as to ensure that the UE is capable of receiving the paging, so that the UE is capable of making a response to the paging on the network where the UE resides, thereby ensuring that the UE residing on any access network is capable of achieving service restoration.

305: The UE executes a service request process.

Specifically, if the UE resides on an E-UTRAN and receives the paging message in step 304, initiating, by the UE, a service request process in the E-UTRAN, for example, includes a step of sending, by the UE, a service request (Service Request) message to the MME. If the UE resides on a UTRAN and receives the paging message in step 304, initiating, by the UE, a service request process in the UTRAN, for example, includes a step of sending, by the UE, a service request (Service Request) message to the SGSN. If the UE resides on a GERAN and receives the paging message in step 304, the UE responds to the paging of the network side by steps such as sending a paging response message to the SGSN from the GERAN.

Step 304 and step 305 may be collectively referred to as a network side triggered service request (Network triggered Service Request) process.

306: The MME/SGSN executes a serving gateway relocation (SGW relocation) process.

The MME/SGSN is the MME/SGSN that receives the service request (Service Request) or the paging response message in step 305. This step may be executed after the MME/SGSN receives the service request or the paging response message in step 305. The network connection of the user equipment is re-established by executing the serving gateway relocation process.

The serving gateway relocation process specifically includes:

306-1: The mobility management network element selects a serving gateway.

The selecting, by the mobility management network element, a serving gateway includes: if a failure of the serving gateway is an SGW failure with restart, selecting a restarted serving gateway or a new serving gateway (for example, a backup serving gateway); and if a failure of the serving gateway is an SGW failure without restart, selecting a new serving gateway (for example, a backup serving gateway).

306-2: The mobility management network element sends a session creation request message to the selected serving gateway.

The mobility management network element may restore all contexts of the user equipment or may restore a part of the contexts through the serving gateway relocation process. For example, the MME/SGSN queries, according to the bearer identity and/or the access point name APN and/or the quality of service class identifier QCI and/or the allocation/retention priority ARP carried in the notification message in step 303, a context of a user equipment that is saved by the MME/SGSN, re-establishes a corresponding PDN connection and/or a corresponding bearer that has the same bearer identity and/or access point name APN and/or quality of service class identifier QCI and/or allocation/retention priority ARP.

306-3: The selected serving gateway sends a bearer modification request message to the packet data network gateway.

306-4: The selected serving gateway receives a bearer modification response message sent by the packet data network gateway.

306-5: The mobility management network element receives a session creation response message sent by the selected serving gateway.

307: The mobility management network element executes a globally unique temporary identifier reallocation (GUTI Reallocation) or packet temporary mobile subscriber identity reallocation (P-TMSI Reallocation) process.

If the mobility management network element is an MME (that is, the mobility management network element in step 306 is an MME), the process includes: sending, by the MME, a globally unique temporary identifier reallocation command (GUTI Reallocation Command) message to the UE, where a tracking area identity list allocated by the MME does not include a tracking area identity broadcast by a radio access network element, so that the user equipment initiates a tracking area update process (Tracking Area Update, TAU for short) process.

If the mobility management network element is an SGSN (that is, the mobility management network element in step 306 is an SGSN), the process includes: executing, by the SGSN, a packet temporary mobile subscriber identity reallocation command (P-TMSI Reallocation Command) message, where a routing area identity allocated by the SGSN is different from a tracking area identity broadcast by a radio access network element, so that the user equipment initiates a tracking area update (Routing Area Update, RAU for short) process.

308: The UE executes the tracking area update process or the routing area update process.

The tracking area update process or the tracking area update process includes the following steps:

308-1: The UE sends a tracking area update request (Tracking Area Update Request, TAU Request for short)/routing area update request (Routing Area Update Request, RAU Request for short) message to the MME/SGSN.

In this case, the MME/SGSN is the mobility management network element in step 307.

308-2: The MME/SGSN sends the bearer modification request message to the SGW to instruct to deactivate ISR (that is, not instructing to activate ISR).

In this case, the SGW is the selected serving gateway in step 306.

308-3: The MME/SGSN sends a tracking area update/tracking area update request accept message to the UE to instruct to deactivate ISR (that is, not instructing to activate ISR).

309: The MME/SGSN sends a request message to the ISR associated SGSN/MME to instruct to deactivate ISR.

Step 309 is an optional step. The request message allows the ISR associated SGSN/MME to delete the saved context of the user equipment. If the request message is not received, the SGSN/MME may delete the saved context of the user equipment after the timer in step 301 expires. In addition, although it is shown in FIG. 3 that 309 is executed after 308, this embodiment of the present invention is not limited thereto. 309 may be executed at the same time as 308, or executed before 308.

According to this embodiment of the present invention, a first mobility management network element and a second mobility management network element that are ISR associated determine that a serving gateway fails and save a context of a user equipment that the serving gateway serves, and when the first mobility management network element or the second mobility management network element receives a notification message that is related to the context of the user equipment and sent by another network element (for example, a packet data network gateway, a serving gateway, or another ISR associated mobility management network element) of a network side, the first mobility management network element or the second mobility management network element executes a service restoration process for the user equipment, thereby ensuring normal operation of a service.

Figure 4:
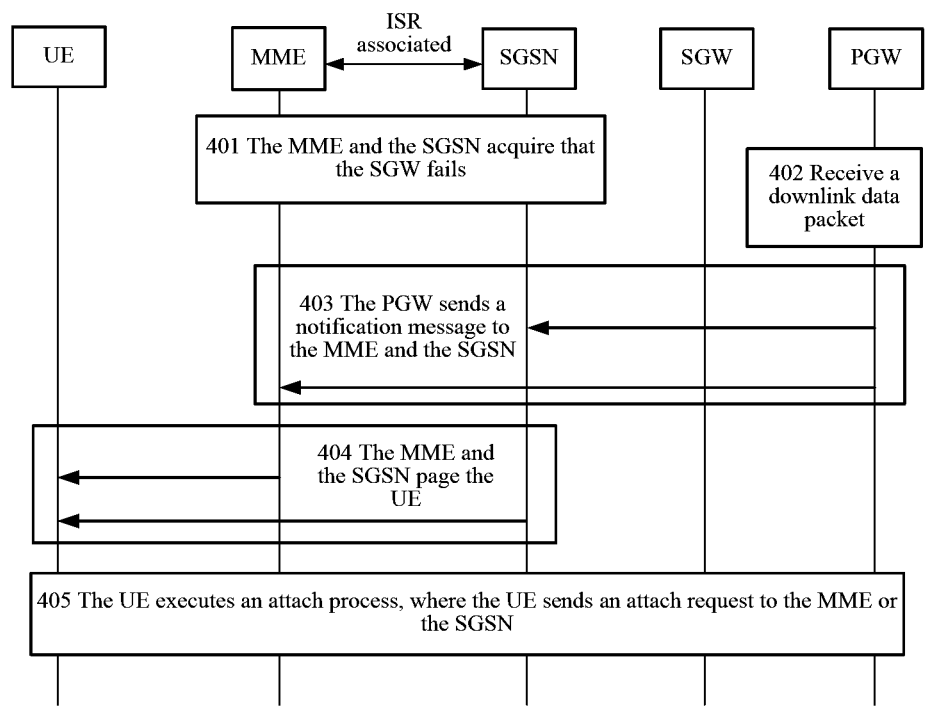
FIG. 4 is a schematic flow chart of a failure processing procedure according to another embodiment of the present invention.

FIG. 4 is a schematic flow chart of a failure processing procedure according to another embodiment of the present invention. In an example in FIG. 4, a first mobility management network element or a second mobility management network element obtains a trigger of a gateway device or another ISR associated mobility management network element and executes a service restoration process.

401: A PGW and an MME/SGSN acquire that an SGW fails.

For a specific implementation manner, refer to the description in 301.

402: The PGW receives a downlink data packet related to the saved context of the user equipment.

For a specific implementation manner, refer to the description in 302.

403: The PGW sends a notification message to the MME/SGSN.

For a specific implementation manner, refer to the description in 303.

404: The MME and the SGSN page the UE.

A difference from step 304 lies in that, the MME pages the UE through an evolved network base station (E-UTRAN NodeB, eNodeB for short), and the paging message carries an international mobile subscriber identity IMSI; and the SGSN pages the UE through a base station (Base Transceiver Station, BTS for short) or a 3G base station (NodeB), and the paging message carries an international mobile subscriber identity IMSI. The MME and the SGSN use the IMSI to page the UE (that is, the paging message carries the IMSI), and trigger the UE to execute an attach process.

In this case, because a network side cannot know whether the UE resides on an E-UTRAN or on a UTRAN/GERAN, both the two mobility management network elements, the MME and the SGSN, need to page the UE, so as to ensure that the UE is capable of receiving the paging, so that the UE is capable of making a response to the paging on the network where the UE resides, thereby ensuring that the UE residing on any access network is capable of achieving service restoration.

405: The UE executes the attach process.

The attach process specifically includes:

405-1: The UE sends a request message to the MME or the SGSN.

Specifically, if the UE resides on an E-UTRAN and receives the paging message in step 404, the UE sends an attach request (Attach Request) message to the MME (in this case, the MME is not limited to the MME that sends the paging message in step 404); and if the UE resides on a UTRAN/GERAN and receives the paging message in step 404, the UE sends an attach request (Attach Request) message to the SGSN (in this case, the SGSN is not limited to the SGSN that sends the paging message in step 404).

405-2: A mobility management network element selects a serving gateway.

The selecting, by the mobility management network element, a serving gateway includes: if a failure of the serving gateway is an SGW failure with restart, selecting a restarted serving gateway or a new serving gateway (for example, a backup serving gateway); and if a failure of the serving gateway is an SGW failure without restart, selecting a new serving gateway (for example, selecting a backup serving gateway).

The attach process further includes: selecting, by the mobility management, a packet data network gateway. In this case, the selected PGW is not limited to a PGW different from the PGW originally served in step 402.

405-3: The mobility management network element sends a session creation request message to the selected serving gateway.

The session creation request message sent by the MME/SGSN to the SGW carries address information/identity information of the selected packet data network gateway. The MME/SGSN instructs the SGW to deactivate ISR (that is, not instructing to activate ISR) through the session creation request message.

405-4: The selected serving gateway sends the session creation request message to the selected packet data network gateway.

405-5: The selected serving gateway receives a session creation response message sent by the selected packet data network gateway.

405-6: The mobility management network element receives the session creation response message sent by the selected serving gateway.

405-7: The mobility management network element sends an attach accept message to the user equipment.

The MME/SGSN instructs the UE to deactivate ISR (that is, not instructing to activate ISR) through the attach accept message.

In addition, this attach process may further include: sending, by the MME/SGSN, a location update message to an HLR/HSS to trigger the HLR/HSS to send a location cancel message to the first mobility management network element and/or the second mobility management network element, so that the first mobility management network element and/or the second mobility management network element deletes the context of the user equipment. Specifically, if the MME/SGSN is not the first mobility management network element or the second mobility management network element, the HLR/HSS sends the location cancel message to the first mobility management network element and the second mobility management network element, so that the first mobility management network element and the second mobility management network element delete the context of the user equipment; or, if the MME/SGSN is the first mobility management network element or the second mobility management network element, the HLR/HSS sends the location cancel message to the second mobility management network element or the first mobility management network element, so that the second mobility management network element or the first mobility management network element deletes the context of the user equipment. In addition, that the MME/SGSN deactivates ISR (that is, deleting F-TEID of the ISR associated second/first mobility management network) is further included.

According to this embodiment of the present invention, a first mobility management network element and a second mobility management network element that are ISR associated determine that a serving gateway fails and save a context of a user equipment that the serving gateway serves, and when the first mobility management network element or the second mobility management network element receives a notification message that is related to the context of the user equipment and sent by another network element (for example, a packet data network gateway, a serving gateway, or another ISR associated mobility management network element) of a network side, the first mobility management network element or the second mobility management network element executes a service restoration process for the user equipment, thereby ensuring normal operation of a service.

Figure 5:
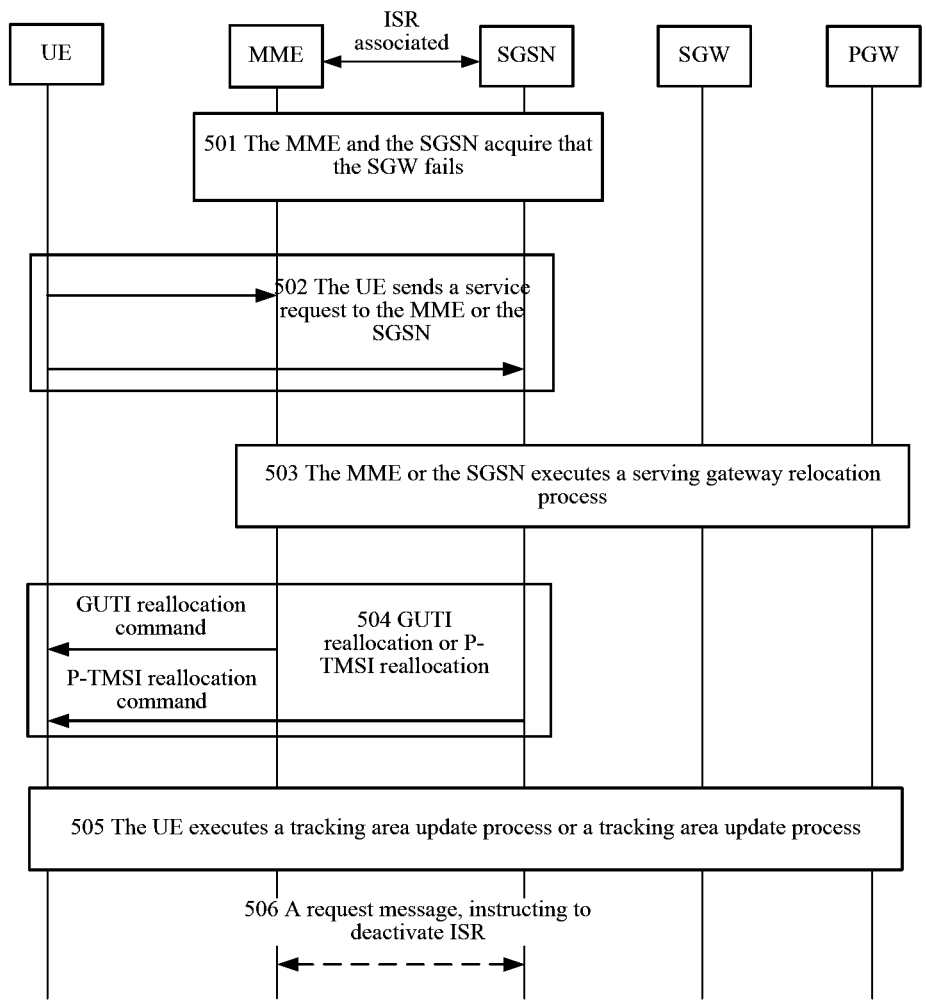
FIG. 5 is a schematic flow chart of a failure processing procedure according to another embodiment of the present invention.

FIG. 5 is a schematic flow chart of a failure processing procedure according to another embodiment of the present invention. In an example in FIG. 5, a first mobility management network element and a second mobility management network element that are ISR associated determine that a serving gateway fails and save a context of a user equipment that the serving gateway serves, and when the first mobility management network element or the second mobility management network element receives a service request message sent by the user, the first mobility management network element or the second mobility management network element executes a service restoration process for the user equipment, thereby ensuring normal operation of a service.

501: A PGW and an MME/SGSN acquire that an SGW fails.

For a specific implementation manner, refer to the description in 301.

502: A UE sends a service request (Service Request) message to the MME or the SGSN.

Specifically, if the UE resides on an E-UTRAN, the UE sends a service request (Service Request) message to the MME; and if the UE resides on a UTRAN, the UE sends a service request (Service Request) message to the SGSN.

Specifically, the MME/SGSN receives the service request message sent by the UE and determines, according to user identity information (for example, an S-TMSI) in the service request message, whether a corresponding context exists, and if yes (that is, a context is located), a subsequent service restoration process is triggered, and if no, the MME/SGSN rejects the service request message or discards the service request message.

In this case, because a network side cannot know whether the UE resides on an E-UTRAN or on a UTRAN/GERAN, both the two mobility management network elements, the MME and the SGSN that are ISR associated in 501, may save the context of the UE, so as to ensure that a mobility management network element (that is, the MME or the SGSN) corresponding to the UE residing on any access network is capable of identifying the service request message of the UE.

503: The MME/SGSN executes a serving gateway relocation (SGW relocation) process.

For a specific implementation manner of the serving gateway relocation process, refer to the description in step 306. The network connection of the user equipment is re-established by executing the serving gateway relocation process.

504: The MME/SGSN executes a globally unique temporary identifier reallocation (GUTI Reallocation) or packet temporary mobile subscriber identity reallocation (P-TMSI Reallocation) process.

For a specific implementation manner for the MME/SGSN to execute the globally unique temporary identifier reallocation or packet temporary mobile subscriber identity reallocation process, refer to the description in step 307. The MME/SGSN executes the globally unique temporary identifier reallocation or packet temporary mobile subscriber identity reallocation process, so that the user equipment initiates a tracking area update process or a tracking area update process.

505: The UE executes the tracking area update process or the tracking area update process.

For a specific implementation manner for the UE to execute the tracking area update process or the tracking area update process, refer to the description in step 308. The MME/SGSN instructs the selected serving gateway (that is, the serving gateway selected in step 503) and/or the user equipment to deactivate ISR (that is, not instructing to activate ISR) through the tracking area update process or the tracking area update process.

Step 506: The MME/SGSN sends a request message to an ISR associated SGSN/MME to instruct to deactivate ISR.

Step 506 is an optional step. The request message allows the ISR associated SGSN/MME to delete the saved context of the user equipment. If the request message is not received, the SGSN/MME may delete the saved context of the user equipment after a timer in step 501 expires. In addition, although it is shown in FIG. 5 that 506 is executed after 505, this embodiment of the present invention is not limited thereto. 506 may be executed at the same time as 505, or executed before 505.

According to this embodiment of the present invention, a first mobility management network element and a second mobility management network element that are ISR associated determine that a serving gateway fails and save a context of a user equipment that the serving gateway serves, and when the first mobility management network element or the second mobility management network element receives a service request message sent by the user equipment, the first mobility management network element or the second mobility management network element executes a service restoration process for the user equipment, thereby ensuring normal operation of a service.

Figure 6:
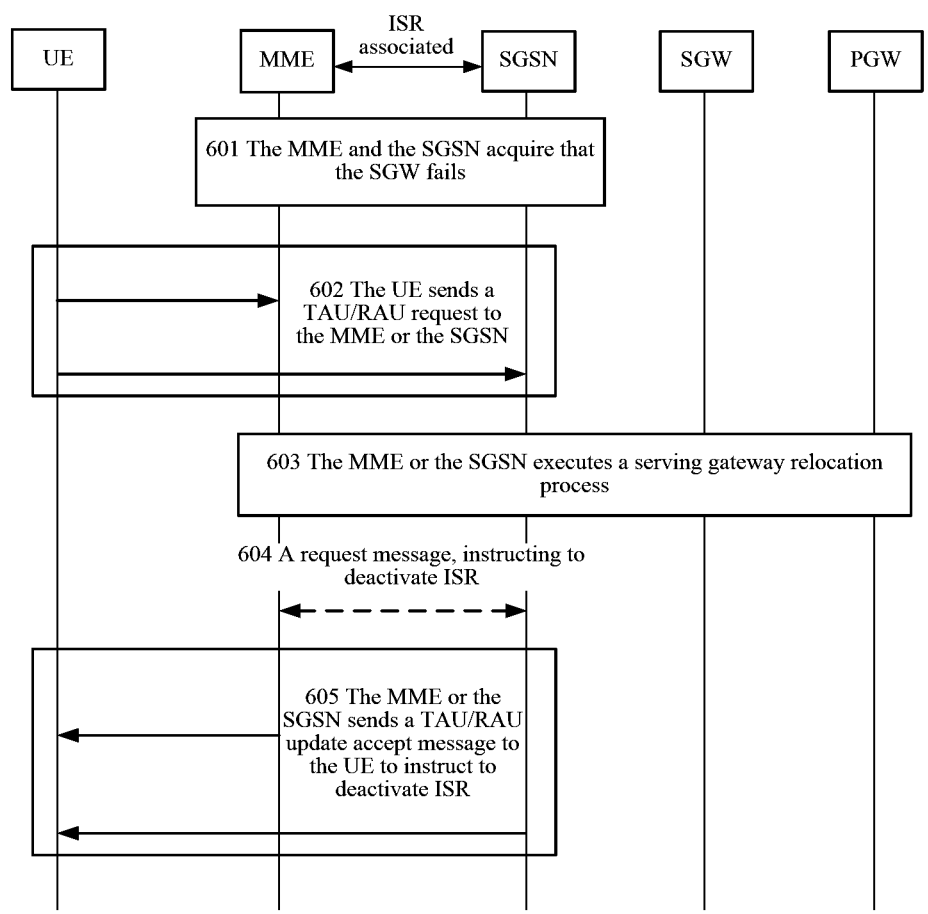
FIG. 6 is a schematic flow chart of a failure processing procedure according to another embodiment of the present invention.

FIG. 6 is a schematic flow chart of a failure processing procedure according to another embodiment of the present invention. In an example in FIG. 6, a first mobility management network element and a second mobility management network element that are ISR associated determine that a serving gateway fails and save a context of a user equipment that the serving gateway serves, and when the first mobility management network element or the second mobility management network element receives a tracking area update request or routing area update request message sent by the user, the first mobility management network element or the second mobility management network element executes a service restoration process for the user equipment, thereby ensuring normal operation of a service.

601: A PGW and an MME/SGSN acquire that an SGW fails.

For a specific implementation manner, refer to the description in 301.

602: A UE sends a tracking area update request (Tracking Area Update Request, TAU Request for short)/routing area update request (Routing Area Update Request, RAU Request for short) message to the MME or the SGSN.

Specifically, if the UE resides on an E-UTRAN, the UE sends the TAU request message to the MME; and if the UE resides on a UTRAN/GERAN, the UE sends the RAU request message to the SGSN.

Specifically, the MME/SGSN receives the TAU/RAU request message sent by the UE and determines, according to user identity information (for example, a GUTI) in the TAU/RAU request message, whether a corresponding context exists, if yes (that is, a context is located), a subsequent service restoration process is triggered, and if no, the MME/SGSN rejects the TAU/RAU request message or discards the TAU/RAU request message.

In this case, because a network side cannot know whether the UE resides on an E-UTRAN or on a UTRAN/GERAN, both the two mobility management network elements, the MME and the SGSN that are ISR associated in 601, may save the context of the UE, so as to ensure that a mobility management network element (that is, the MME or the SGSN) corresponding to the UE residing on any access network is capable of identifying the TAU/RAU request message of the UE.

603: The MME/SGSN executes a serving gateway relocation process.

For a specific implementation manner of the serving gateway relocation process, refer to the description in step 306. The network connection of the user equipment is re-established by executing the serving gateway relocation process.

604: The MME/SGSN sends a request message to an ISR associated SGSN/MME to instruct to deactivate ISR.

Step 604 is an optional step. The request message allows the ISR associated SGSN/MME to delete the saved context of the user equipment. If the request message is not received, the SGSN/MME may delete the saved context of the user equipment after a timer in step 601 expires.

605: The MME/SGSN sends a tracking area update/tracking area update request accept message to the UE to instruct to deactivate ISR (that is, not instructing to activate ISR).

In addition to that the MME/SGSN instructs the UE to deactivate ISR, instructing, by the MME/SGSN, the serving gateway to deactivate ISR (that is, not instructing to activate ISR) is further included. Specifically, the MME/SGSN may give an instruction in the serving gateway relocation process in step 603, for example, giving the instruction to deactivate ISR in a session creation request message sent by the MME/SGSN to the SGW, or may give an instruction in another step, for example, giving the instruction to deactivate ISR in a bearer modification request message sent by the MME/SGSN to the SGW.

According to this embodiment of the present invention, a first mobility management network element and a second mobility management network element that are ISR associated determine that a serving gateway fails and save a context of a user equipment that the serving gateway serves, and when the first mobility management network element or the second mobility management network element receives a tracking area update request or routing area update request message sent by the user equipment, the first mobility management network element or the second mobility management network element executes a service restoration process for the user equipment, thereby ensuring normal operation of a service.

Figure 7:
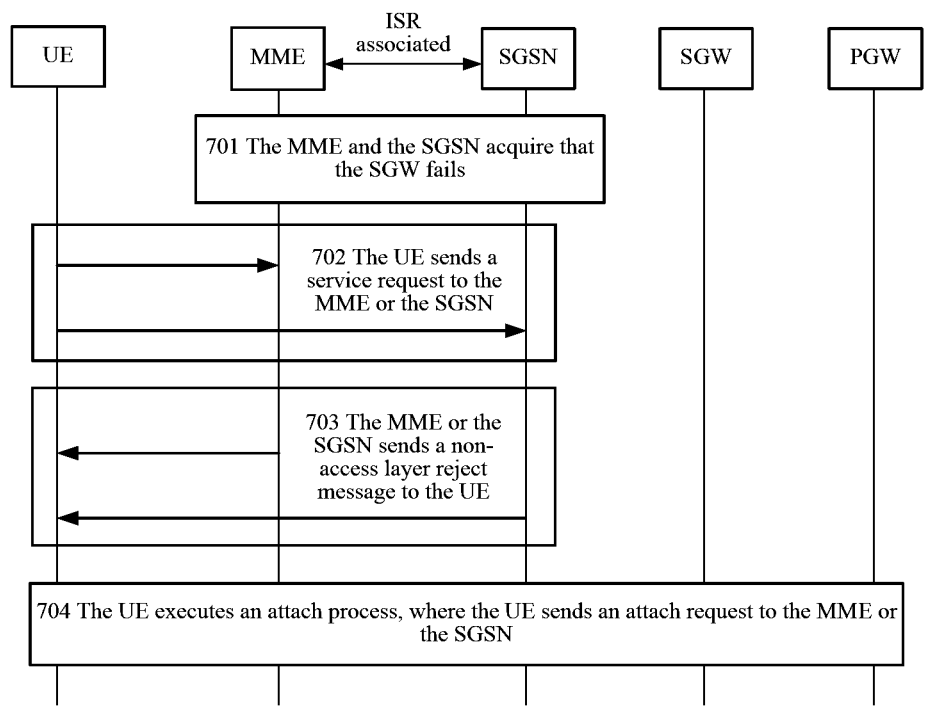
FIG. 7 is a schematic flow chart of a failure processing procedure according to another embodiment of the present invention.

FIG. 7 is a schematic flow chart of a failure processing procedure according to another embodiment of the present invention. In an example in FIG. 7, a mobility management network element obtains a trigger of a user equipment and re-establishes a network connection to the user equipment.

701: An MME/SGSN acquires that an SGW fails.

For a specific implementation manner, refer to the description in 301.

702: A UE sends a non-access layer request message to the MME or the SGSN.

The non-access layer request message may include, but is not limited to the following messages: a tracking area update request (Tracking Area Update Request, TAU Request for short)/routing area update request (Routing Area Update Request, RAU Request for short)/service request (Service Request) message.

Specifically, the MME/SGSN receives the non-access layer request message sent by the UE and determines, according to user identity information (for example, a GUTI or an S-TMSI) in the non-access layer request message, whether a corresponding context exists, and if yes (that is, a context is located), the MME/SGSN determines that a non-access layer request message related to the saved context of the user equipment is received, and a subsequent service restoration process is triggered.

In this case, because a network side cannot know whether the UE resides on an E-UTRAN or on a UTRAN/GERAN, both the two mobility management network elements, the MME and the SGSN that are ISR associated in 701, may save the context of the UE, so as to ensure that a mobility management network element (that is, the MME or the SGSN) corresponding to the UE residing on any access network is capable of identifying the non-access layer request message of the UE.

703: The MME/SGSN sends a non-access layer reject message to the UE.

Specifically, the MME/SGSN sends a tracking area update reject/routing area update reject/service reject message to the UE and triggers the UE to execute an attach process. The tracking area update reject/routing area update reject/service reject message may carry an existing cause value, for example, #10 (Implicitly detached), or may be a newly added cause value (for example, an SGW Failure), which is not limited in this embodiment.

704: The UE executes the attach process.

For a specific implementation manner of the attach process, refer to the description in step 405. In the attach process, the UE sends an attach request message to the MME/SGSN (not limited to the MME/SGSN in step 701), and the MME/SGSN selects a new SGW (not limited to the serving gateway that fails in step 701) and a new PGW (not limited to a packet data network gateway serving in step 701), and establish network connection of the user equipment.

According to this embodiment of the present invention, a first mobility management network element and a second mobility management network element that are ISR associated determine that a serving gateway fails and save a context of a user equipment that the serving gateway serves, and when the first mobility management network element or the second mobility management network element receives a tracking area update request, routing area update request, or service request message sent by the user equipment, the first mobility management network element or the second mobility management network element executes a service restoration process for the user equipment, thereby ensuring normal operation of a service.

Figure 8:
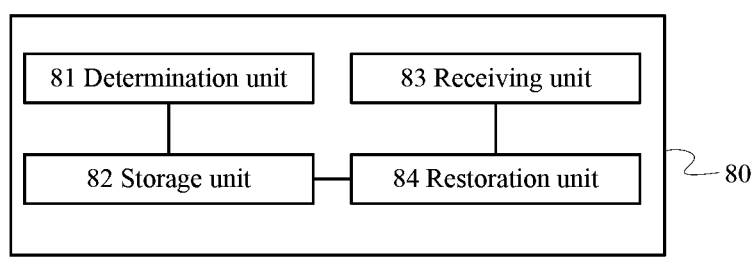
FIG. 8 is a schematic block diagram of a mobility management network element according to an embodiment of the present invention.

FIG. 8 is a schematic block diagram of a mobility management network element according to an embodiment of the present invention. An example of a mobility management network element 80 in FIG. 8 is the first mobility management network element or the second mobility management network element (for example, an MME or an SGSN) and includes a determination unit 81, a storage unit 82, a receiving unit 83, and a restoration unit 84. The determination unit 81, the receiving unit 83, and the restoration unit 84 may be implemented by a processor, and the storage unit 82 may be implemented by a storage. The mobility management network element 80 is ISR associated with another mobility management network element.

The determination unit 81 determines that a serving gateway fails. When the determination unit 81 determines that the serving gateway fails, the storage unit 82 saves a context of a user equipment that the serving gateway serves. The receiving unit 83 receives a trigger. When the receiving unit 83 receives the trigger, the restoration unit 84 executes a service restoration process for the user equipment.

According to this embodiment of the present invention, an ISR associated mobility management network element determines that a serving gateway fails and saves a context of a user equipment associated with the serving gateway, and when the mobility management network element receives a trigger from the user equipment or another network element of a network side, the mobility management network element executes a service restoration process, thereby ensuring normal operation of a service.

Alternatively, in an embodiment, the trigger may be a notification message sent by a packet data network gateway or a serving gateway, or a notification message sent by another mobility management network element, or a tracking area update request, routing area update request, or service request message sent by a user equipment. That is to say, as the trigger, the receiving unit 83 receives the notification message sent by the packet data network gateway or the serving gateway or the notification message sent by the another mobility management network element, or receive the tracking area update request, routing area update request, or service request message sent by the user equipment.

The restoration unit 84 is specifically configured to execute a network connection re-establishment process or trigger the user equipment to initiate an attach process.

Figure 9:
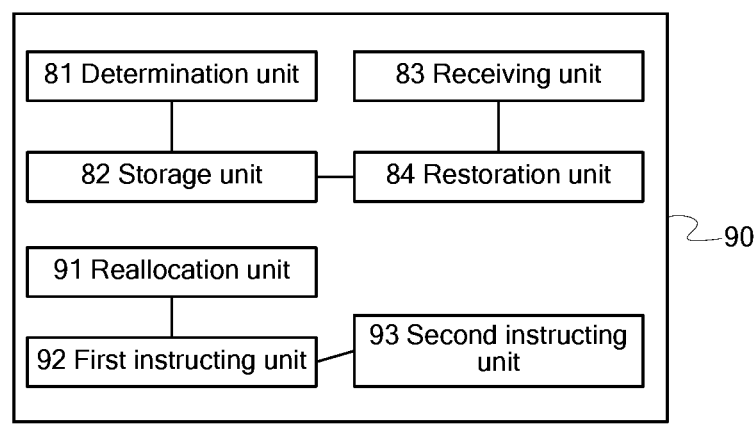
FIG. 9 is a schematic block diagram of a mobility management network element according to another embodiment of the present invention.

FIG. 9 is a schematic block diagram of a mobility management network element according to another embodiment of the present invention. In addition to a determination unit 81, a storage unit 82, a receiving unit 83, and a restoration unit 84 in FIG. 8, a mobility management network element 90 in FIG. 9 further includes a reallocation unit 91 and a first instructing unit 92 or a second instructing unit 93. The reallocation unit 91 and the first instructing unit 92 or the second instructing unit 93 may be implemented by a processor.

Alternatively, in an embodiment, in the case that the receiving unit 83 receives a notification message sent by a packet data network gateway or a serving gateway or receives a notification message sent by the another mobility management network element, the restoration unit 84 may execute a network connection re-establishment message. Specifically, the restoration unit 84 sends a paging message to the user equipment, receives a service request process sent by the user equipment, and executes a serving gateway relocation process.

Alternatively, in another embodiment, in the case that the receiving unit 83 receives a service request message sent by the user equipment, the restoration unit 84 may execute a network connection re-establishment process. Specifically, the restoration unit 84 executes a serving gateway relocation process.

In this case, after the receiving unit 83 receives the service request message sent by the user equipment, the reallocation unit 91 may execute a globally unique temporary identifier reallocation GUTI or packet temporary mobile subscriber identity P-TMSI reallocation process, so that the user equipment executes a tracking area update or routing area update process to deactivate ISR.

Alternatively, in another embodiment, in the case that the receiving unit 83 receives a tracking area update request or routing area update request message sent by the user equipment, the restoration unit 84 may execute a network connection re-establishment process. Specifically, the restoration unit 84 executes a serving gateway relocation process.

In this case, after the receiving unit 83 receives the tracking area update request or routing area update request message sent by the user equipment, the first instructing unit 92 instructs the user equipment to deactivate ISR and/or instructs the serving gateway to deactivate ISR.

When executing the serving gateway relocation process, the restoration unit 84 may select a serving gateway and send a session creation request message to the selected serving gateway, so that the selected serving gateway sends a bearer modification request message to the packet data network gateway.

Alternatively, in another embodiment, in the case that the receiving unit 83 receives a notification message sent by a packet data network gateway or a serving gateway or receives a notification message sent by another mobility management network element, the restoration unit 84 may trigger the user equipment to initiate an attach process. Specifically, the restoration unit 84 sends a paging message carrying an IMSI of the user equipment to the user equipment, so that the user equipment initiates the attach process.

Alternatively, in another embodiment, in the case that the receiving unit 83 receives a service request, tracking area update request, or routing area update request message sent by the user equipment, the restoration unit 84 may trigger the user equipment to initiate an attach process. Specifically, the restoration unit 84 sends a service reject, tracking area update reject, or routing area update message to the user equipment, so that the user equipment initiates the attach process.

The notification message received by the receiving unit 83 may carry an international mobile subscriber identity of the user equipment. In addition, the notification message may further include a bearer identity, an access point name APN, a quality of service class identifier QCI, and/or allocation/retention priority ARP.

Alternatively, in another embodiment, the second instructing unit 93 instructs another mobility management network element to deactivate ISR.

Each part of the mobility management network elements 80 and 90 is capable of executing each procedure in the methods in FIG. 2 to FIG. 7. In order to avoid repetition, details are not described herein again.

A communication system according to an embodiment of the present invention may include the first mobility management network element and the second mobility management network element that are ISR associated.

Persons of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in the present application, it should be understood that the disclosed system, apparatus, and method may be implemented in other modes. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on multiple network units. A part or all of the units may be selected according to the actual needs to achieve the objectives of the solutions of the embodiments.

In addition, functional units in the embodiments of the present invention may be integrated into a processing unit, or each of the units may exist alone physically, or two or more units are integrated into a unit. The integrated unit may be implemented in a form of hardware, or may be implemented in a form of a software functional unit.

When the integrated units are implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, and the like) to execute all or a part of steps of the methods described in the embodiments of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the appended claims.

What is claimed is:

1. A service restoration processing method, comprising:
   determining, by a first mobility management network element, that a first serving gateway fails, wherein the first mobility management network element is idle mode signaling reduction associated (ISR associated) with a second mobility management network element;
   saving, by the first mobility management network element, a context of a user equipment that the first serving gateway serves;
   receiving, by the first mobility management network element, a trigger; and
   executing, by the first mobility management network element, a network connection re-establishment process for the user equipment.

2. The method according to claim 1, wherein the receiving, by the first mobility management network element, the trigger comprises:
   receiving, by the first mobility management network element, a notification message sent by a packet data network gateway or a second serving gateway; or
   receiving, by the first mobility management network element, a notification message sent by the second mobility management network element.

3. The method according to claim 1, wherein the receiving, by the first mobility management network element, the trigger comprises:
    receiving, by the first mobility management network element, a tracking area update request or a routing area update request sent by the user equipment.

4. The method according to claim 1, wherein the receiving, by the first mobility management network element, the trigger comprises:
    receiving, by the first mobility management network element, a service request message sent by the user equipment.

5. The method according to claim 2, wherein the executing the network connection re-establishment process comprises:
    sending, by the first mobility management network element, a paging message to the user equipment;
    receiving, by the first mobility management network element, the service request message sent by the user equipment; and
    executing, by the first mobility management network element, a serving gateway relocation process.

6. The method according to claim 4, wherein the executing the network connection re-establishment process comprises:
    executing, by the first mobility management network element, a serving gateway relocation process.

7. The method according to claim 5, wherein after the receiving, by the first mobility management network element, the service request message sent by the user equipment, the method further comprises:
    executing, by the first mobility management network element, a globally unique temporary identifier (GUTI) reallocation or packet temporary mobile subscriber identity (P-TMSI) reallocation process, so that the user equipment executes a tracking area update or a routing area update process to deactivate ISR.

8. The method according to claim 6, wherein after the receiving, by the first mobility management network element, the service request message sent by the user equipment, the method further comprises:
    executing, by the first mobility management network element or the second mobility management network element, a globally unique temporary identifier (GUTI) reallocation or packet temporary mobile subscriber identity (P-TMSI) reallocation process, so that the user equipment executes a tracking area update or routing area update process to deactivate ISR.

9. The method according to claim 3, wherein the executing the network connection re-establishment process comprises:
    executing, by the first mobility management network element, a serving gateway relocation process.

10. The method according to claim 9, wherein after the receiving, by the first mobility management network element, the tracking area update request or the routing area update request message sent by the user equipment, the method further comprises:
    instructing, by the first mobility management network element, the user equipment to deactivate ISR; and/or
    instructing, by the first mobility management network element, the serving gateway to deactivate ISR.

11. The method according to claim 5, wherein the executing the serving gateway relocation process comprises:
    selecting, by the first mobility management network element, a third serving gateway; and
    sending, by the first mobility management network element, a session creation request message to the third serving gateway, so that the third serving gateway sends a bearer modification request message to the packet data network gateway.

12. A mobility management network element, wherein the mobility management network element is idle mode signaling reduction associated (ISR associated) with another mobility management network element, and the mobility management network element comprises:
    a determination unit, configured to determine that a first serving gateway fails;
    a storage unit, configured to save a context of a user equipment that the first serving gateway serves when the determination unit determines that the serving gateway fails;
    a receiving unit, configured to receive a trigger; and
    a restoration unit, configured to execute a network connection re-establishment process for the user equipment when the receiving unit receives the trigger.

13. The mobility management network element according to claim 12, wherein the receiving unit is configured to receive a notification message sent by a packet data network gateway or a second serving gateway, or a notification message sent by the another mobility management network element.

14. The mobility management network element according to claim 12, wherein the receiving unit is configured to receive a tracking area update request or a routing area update request.

15. The mobility management network element according to claim 12, wherein the receiving unit is configured to receive a service request message sent by the user equipment.

16. The mobility management network element according to claim 13, wherein the executing, by the restoration unit, the network connection re-establishment process comprises:
    sending, by the restoration unit, a paging message to the user equipment,
    receiving a service request message sent by the user equipment, and
    executing a serving gateway relocation process.

17. The mobility management network element according to claim 15, wherein the executing, by the restoration unit, the network connection re-establishment process comprises:
    executing, by the restoration unit, a serving gateway relocation process.

18. The mobility management network element according to claim 16, further comprising:
    a reallocation unit, configured to execute, after the receiving unit receives the service request message sent by the user equipment, a globally unique temporary identifier (GUTI) reallocation or packet temporary mobile subscriber identity (P-TMSI) reallocation process, so that the user equipment executes a tracking area update or routing area update process to deactivate ISR.

19. The mobility management network element according to claim 17, further comprising:
    a reallocation unit, configured to execute, after the receiving unit receives the service request message sent by the user equipment, a globally unique temporary identifier (GUTI) reallocation or packet temporary mobile subscriber identity (P-TMSI) reallocation process, so that the user equipment executes a tracking area update or routing area update process to deactivate ISR.

20. The mobility management network element according to claim 14, wherein the executing, by the restoration unit, the network connection re-establishment process comprises:
    executing, by the restoration unit, a serving gateway relocation process.

21. The mobility management network element according to claim 16, wherein the executing, by the restoration unit, the serving gateway relocation process comprises:
- selecting, by the restoration unit, a third serving gateway, and
- sending a session creation request message to the third serving gateway, so that the third serving gateway sends a bearer modification request message to the packet data network gateway.

22. The mobility management network element according to claim 17, wherein the executing, by the restoration unit, the serving gateway relocation process comprises:
- selecting, by the restoration unit, a third serving gateway, and
- sending a session creation request message to the third serving gateway, so that the third serving gateway sends a bearer modification request message to the packet data network gateway.

23. The mobility management network element according to claim 20, wherein the executing, by the restoration unit, the serving gateway relocation process comprises:
- selecting, by the restoration unit, a third serving gateway, and
- sending a session creation request message to the third serving gateway, so that the third serving gateway sends a bearer modification request message to the packet data network gateway.

* * * * *